(12) United States Patent
Hosoi

(10) Patent No.: US 9,036,903 B2
(45) Date of Patent: May 19, 2015

(54) LEARNING DEVICE, IDENTIFICATION DEVICE, LEARNING IDENTIFICATION SYSTEM AND LEARNING IDENTIFICATION DEVICE

(75) Inventor: Toshinori Hosoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 300 days.

(21) Appl. No.: 13/520,766

(22) PCT Filed: Dec. 24, 2010

(86) PCT No.: PCT/JP2010/073873
§ 371 (c)(1),
(2), (4) Date: Jul. 5, 2012

(87) PCT Pub. No.: WO2011/083749
PCT Pub. Date: Jul. 14, 2011

(65) Prior Publication Data
US 2012/0281909 A1 Nov. 8, 2012

(30) Foreign Application Priority Data
Jan. 6, 2010 (JP) .................. 2010-001265

(51) Int. Cl.
*G06K 9/00* (2006.01)
*G06K 9/46* (2006.01)
(52) U.S. Cl.
CPC .......... *G06K 9/00248* (2013.01); *G06K 9/4614* (2013.01)
(58) Field of Classification Search
CPC ...................................................... G06K 9/00
USPC .................. 382/157, 159, 197, 279
See application file for complete search history.

(56) References Cited

U.S. PATENT DOCUMENTS 6,519,372 B1 * 2/2003 Eppler et al. .................. 382/294
7,518,733 B2 * 4/2009 Bankhead et al. ............ 356/511
(Continued)

FOREIGN PATENT DOCUMENTS

CN 1901607 A 1/2007
CN 101511031 A 8/2009
(Continued)

OTHER PUBLICATIONS

Paul Viola, Michael Jones, "Rapid Object Detection using a Boosted Cascade of Simple Features", Proceeding of Computer Vision and Pattern Recognition, 2001.
(Continued)

*Primary Examiner* — Gregory M Desire
(74) *Attorney, Agent, or Firm* — Sughrue Mion, PLLC

(57) ABSTRACT

A learning device includes a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate.

33 Claims, 15 Drawing Sheets

(56) References Cited

U.S. PATENT DOCUMENTS

| | | | |
|---|---|---|---|
| 8,103,091 B2* | 1/2012 | Hosoi | 382/157 |
| 8,379,986 B2* | 2/2013 | Tsurumi | 382/203 |
| 8,705,881 B2* | 4/2014 | Wang et al. | 382/255 |
| 2006/0029276 A1 | 2/2006 | Nagahashi et al. | |
| 2012/0093420 A1* | 4/2012 | Zhang et al. | 382/197 |
| 2012/0281909 A1* | 11/2012 | Hosoi | 382/159 |

FOREIGN PATENT DOCUMENTS

| | | |
|---|---|---|
| CN | 101515325 A | 8/2009 |
| CN | 101551863 A | 10/2009 |
| JP | H01321589 | 12/1989 |
| JP | 2005190383 A | 7/2005 |
| JP | 2005234603 A | 9/2005 |
| JP | 2005284697 A | 10/2005 |
| JP | 200648322 A | 2/2006 |
| JP | 2006301811 A | 11/2006 |
| JP | 200859110 A | 3/2008 |

OTHER PUBLICATIONS

International Seach Report for PCT/JP2010/073873.
Form PCT ISA237 for PCT/JP2010/073873.
Chinese Office Action for CN Application No. 201080060941.4 mailed on Apr. 29, 2014 with English Translation.

* cited by examiner

Fig.3A
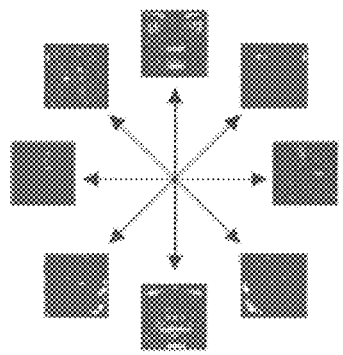
Fig.3B
☐ FEATURE VALUE THAT IS A TARGET OF ADDITION
■ FEATURE VALUE THAT IS A TARGET OF SUBTRACTION
Fig.3C
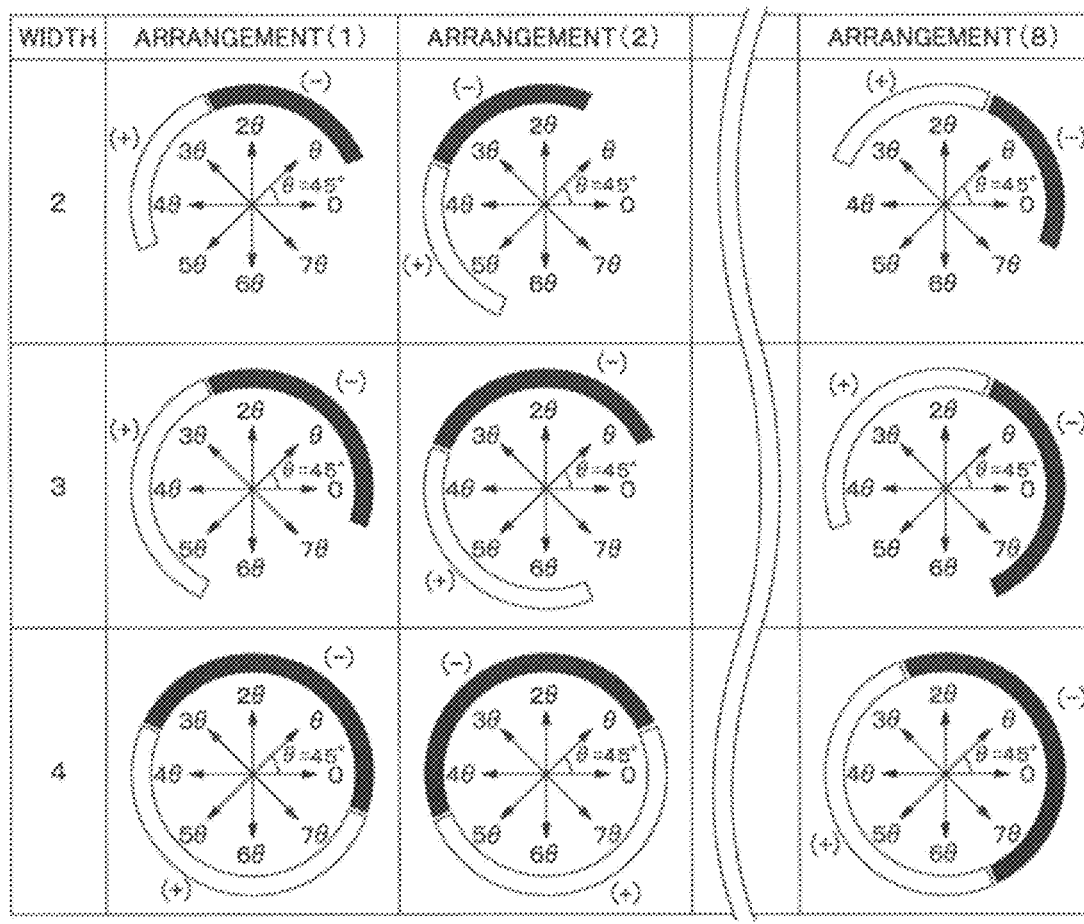

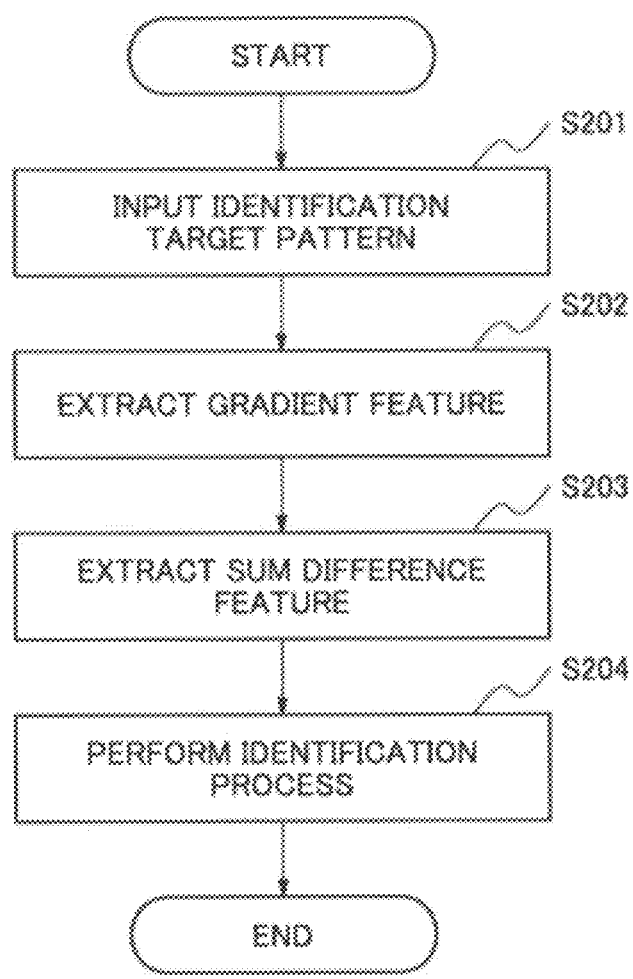

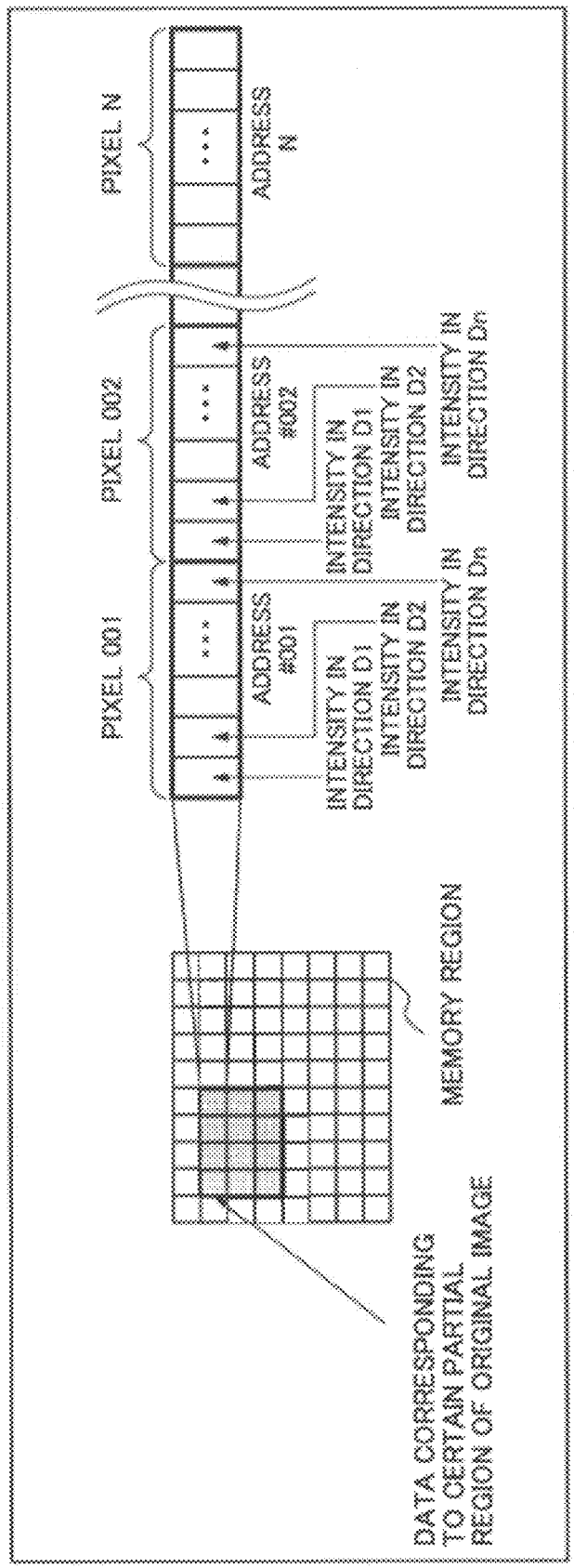

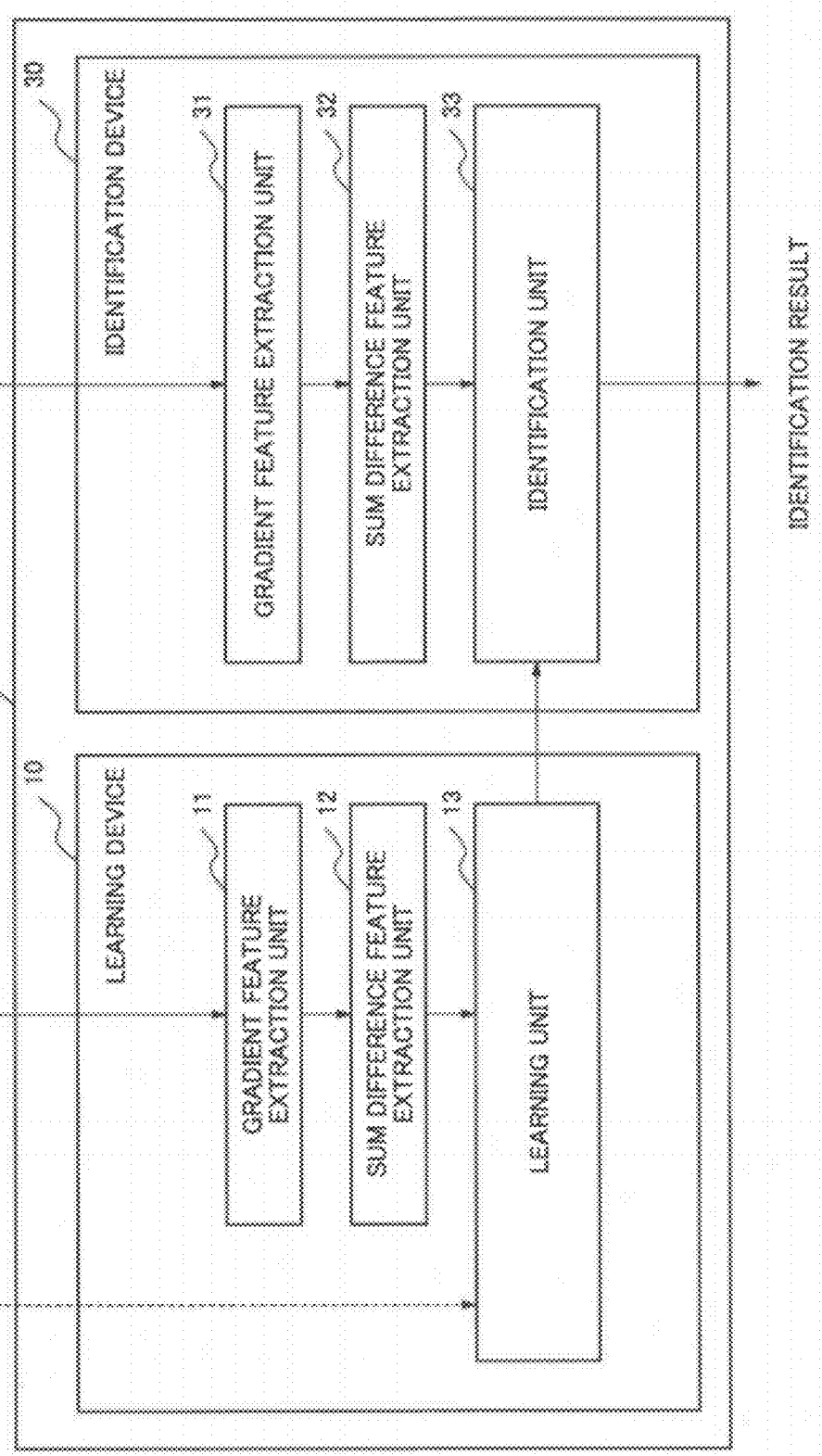

LEARNING DEVICE, IDENTIFICATION DEVICE, LEARNING IDENTIFICATION SYSTEM AND LEARNING IDENTIFICATION DEVICE

TECHNICAL FIELD

The present invention relates to a learning device which learns a learning target pattern in advance for object identification, a learning method, a recording medium storing a learning program, an identification device which inputs an identification target pattern and identifies it, an identification method, and a recording medium storing an identification program, as well as a learning identification system which learns the learning target pattern and identifies the identification target pattern, a learning identification device, a learning identification method, and a recording medium storing a learning identification program.

BACKGROUND ART

A statistical pattern identification method is generally known as a method for identifying an object from an image.

The statistical pattern identification method is a method with which a relation between input and output is estimated based on several input-output pairs. More particularly, the statistical pattern identification method is a method in which a desirable input-output relation is learnt from a large number of input data and output data and this relation is used for the identification.

Therefore, the statistical pattern identification method is realized by mainly, a learning process and an identification process.

The learning process is a process for acquiring a learning parameter used for the identification process by using sample data for learning and teacher data thereof. The teacher data is data indicating a correct identification result (output) to the sample data (input).

Specifically, the teacher data is either an arithmetic expression or the learning parameter for deriving an output value from an input value (for example, the input value and the output value corresponding to the input value), or both of them.

In other words, as mentioned above, the learning process is a calculation process whose purpose is to acquire the learning parameter for calculating data to be outputted to an arbitrary input inputted at an identification process stage.

For example, in case of the learning process using a multi-layer perceptron which is one kind of neural networks, "a connection weight" between respective nodes is acquired as the learning parameter.

On the other hand, the identification process is a process for calculating an output (an identification result) by using the learning parameter to the inputted arbitrary data (the identification target).

Generally, in order to improve accuracy of the identification process, a complicated feature extraction process is performed to each of a large number of learning target patterns. For example, when character recognition is performed, a slope, a width, a curvature, the number of loops, and the like of a line of a certain character corresponding to the learning target pattern are extracted as a feature amount. For this reason, in other words, the feature extraction process is a process for creating another pattern from an original pattern.

Here, a general feature extraction process will be described with reference to FIG. 14.

FIG. 14 is a block diagram showing a general configuration for performing the identification process based on a statistical pattern identification method.

First, as shown in FIG. 14, after the arbitrary identification target pattern is inputted, pre-processing means A1 perform a preliminary process (noise elimination and normalization) which allows a subsequent process to be easily performed.

Next, the feature extraction means A2 extract feature amounts (a numerical value and a symbol) which provide pattern-specific behavior from the identification target pattern to which the preliminary process has been performed.

For example, when d feature amounts are extracted, the feature amount can be represented by a feature vector as expressed by the following equation.

$$X=(x_1, x_2, \ldots, x_d)$$

Identification calculation means A3 input the feature amount extracted by the feature extraction means A2 and determine "classification/category/class" of the identification target.

Specifically, the identification calculation means A3 performs the calculation to determine whether or not the extracted feature amount is a specific target based on a calculation method specified by the learning parameter stored in a dictionary storage unit A4 in advance.

For example, the identification calculation means A3 determine that the extracted feature amount is the specific target if the calculation result is "1" and it is not the specific target if the calculation result is "0". Further, the identification calculation means A3 can determine whether or not the extracted feature amount is the specific target based on whether or not the calculation result is lower than a predetermined threshold value.

Here, in the following related technology, in order to maintain high identification accuracy, it has been required that the number of dimensions of the feature vector $x_d$ is equal to or greater than a predetermined value. Further, not only such method but also other various methods have been used.

For example, in the method proposed by non-patent document 1, a rectangle feature is extracted from the target pattern.

In the method proposed by patent document 1, a directional pattern indicating a distribution of a directional component on a character pattern is created. A vertical direction component, a horizontal direction component, and a diagonal direction component based on this directional pattern are extracted as a directional feature pattern for character recognition. In other words, in this method, the read character is reproduced by combining these directional components.

In the technology proposed by patent document 2, with respect to a plurality of measuring points on an image, a near region of narrow width fixed shape for measurement is provided at both wings of a search line passing through each measuring point. By this technology, a direction of a luminance gradient vector of the image is measured at a plurality of near points in this region. In this technology, a degree of concentration is calculated at each near point from the difference between the direction of the vector and the direction of the search line, a degree of line concentration to the measuring point is calculated from all degrees of concentration, and when it becomes maximal, it is determined that line information exists along the direction of the search line. In this technology, a basic additional value that can be used at each measuring point is calculated based on the degree of concentration in advance. In this technology, when the direction of the vector is measured, one of the basic additional values is selected and added for each direction of the search line and whereby, the degree of line concentration at each measuring point is calculated, and when this value becomes maximal, the line information is expected.

In the technology proposed by patent document 3, with respect to the feature amount of a certain object, by replacing the feature amount component corresponding to a background region with another value, a plurality of feature amount data whose backgrounds are different are generated from one object image and the identification parameter is learned.

RELATED ART DOCUMENT

Non-patent document

Non-patent document 1: Paul Viola, Michael Jones, "Rapid Object Detection using a Boosted Cascade of Simple Feature" Proceeding of Computer Vision and Pattern Recognition 2001

Patent Document

Patent document 1: Japanese Patent Publication No. 2605807
Patent document 2: Japanese Patent Application Laid-Open No. 2005-284697
Patent document 3: Japanese Patent Application Laid-Open No. 2008-059110

SUMMARY OF THE INVENTION

Problems to be Solved by the Invention

However, when such method is used, the following problem occurs.

First, in the technology disclosed in non-patent document 1, the feature used for the learning process is a simple rectangle. Therefore, many parameters that are not useful for identification are included in the extracted feature amount. Accordingly, when the technology is used, a problem occurs in which a large number of feature amounts are required in order to maintain the identification accuracy (in other words, in the learning process, higher order calculation is necessary) and the calculation cost becomes extremely high.

As a result, because it takes much time for the learning process, in this technology, a problem in which a period until the identification process can be performed is prolonged occurs.

In the technology disclosed in patent document 1, the higher order calculation is necessary in the identification process because the feature used for identification is complicated and whereby, the identification process cannot be smoothly performed.

In the technologies disclosed in patent documents 2 and 3, the content of the process of the filter used for the calculation process is different from that of the present invention. Therefore, the above-mentioned problem cannot be solved.

An object of the present invention is to provide a learning device in which the use of the high dimensional feature amount and complication of the feature extraction that are essentially required for maintaining and improving identification accuracy when performing pattern recognition are avoided and whereby, a load on a calculation cost in a learning process and an identification process can be reduced and smooth pattern recognition can be performed, a learning method, a recording medium storing a learning program, an identification device, an identification method, and a recording medium storing an identification program, as well as a learning identification system, a learning identification device, a learning identification method, and a recording medium storing a learning identification program.

Means for Solving the Problems

A learning device according to one exemplary embodiment of the present invention comprises a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate based on a predetermined learning algorithm using the gradient feature amount and the sum difference feature amount.

Father, a learning method according to one exemplary embodiment of the present invention comprises the steps of extracting a gradient feature amount including a gradient direction at each coordinate and a gradient intensity value thereof based on an amount of variation between luminance at each coordinate of an inputted learning target pattern and luminance at a periphery thereof, calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and acquiring a learning parameter at each coordinate based on a predetermined learning algorithm using the gradient feature amount and the sum difference feature amount.

Farther more, a recording medium storing a learning program according to one exemplary embodiment of the present invention causes a computer to function as a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate based on a predetermined learning algorithm using the gradient feature amount and the sum difference feature amount.

Farther, an identification device according to one exemplary embodiment of the present invention comprises a gradient feature extraction unit which extracts a gradient feature amount including a gradient direction at each coordinate and a gradient intensity value thereof based on an amount of variation between luminance at each coordinate of an inputted identification target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and an identification unit which identifies a type to which the identification target pattern belongs among one or more types based on the gradient feature amount, the sum difference feature amount, and a part of or all learning parameters acquired by the predetermined learning algorithm.

Father more, an identification method according to one exemplary embodiment of the present invention comprises the steps of extracting a gradient feature amount including a gradient direction at each coordinate and a gradient intensity value thereof based on an amount of variation between luminance at each coordinate of an inputted identification target pattern and luminance at a periphery thereof, calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and identifying a type to which the identification target pattern belongs among one or more types based on the gradient feature amount, the sum difference feature amount, and a part of or all learning parameters acquired by the predetermined learning algorithm.

Father more, a recording medium storing an identification program according to one exemplary embodiment of the present invention causes a computer to function as a gradient feature extraction unit which extracts a gradient feature amount including a gradient direction at each coordinate and a gradient intensity value thereof based on an amount of variation between luminance at each coordinate of an inputted identification target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and an identification unit which identifies a type to which the identification target pattern belongs among one or more types based on the gradient feature amount, the sum difference feature amount, and a part of or all learning parameters acquired by the predetermined learning algorithm.

Farther, a learning identification system according to one exemplary embodiment of the present invention comprises that a learning device includes a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate based on a predetermined learning algorithm using the gradient feature amount and the sum difference feature amount; and an identification device includes a gradient feature extraction unit which extracts a gradient feature amount including a gradient direction at each coordinate and a gradient intensity value thereof based on an amount of variation between luminance at each coordinate of an inputted identification target pattern and luminance at a periphery thereof, a sum difference feature extraction unit which calculates a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum, and an identification unit which identifies a type to which the identification target pattern belongs among one or more types based on the gradient feature amount, the sum difference feature amount, and a part of or all learning parameters acquired by the learning unit.

Father more, a learning identification device including an identification unit for identifying a type to which an identification target pattern belongs among one or more types comprises that the learning identification device includes a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate based on a predetermined learning algorithm using the gradient feature amount and the sum difference feature amount; the gradient feature extraction unit extracts the gradient feature amount including the gradient direction at each coordinate and the gradient intensity value thereof based on an amount of variation between luminance at each coordinate of the inputted identification target pattern and luminance at a periphery thereof; the sum difference feature extraction unit calculates a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum; and an identification unit identifies a type to which the identification target pattern belongs among one or more types based on the gradient feature amount and the sum difference feature amount that are calculated from the identification target pattern as well as a part of or all learning parameters acquired by the learning unit.

Father, a learning identification method according to one exemplary embodiment of the present invention comprises the steps of extracting a gradient feature amount including a gradient direction at each coordinate and a gradient intensity value based on an amount of variation between luminance at each coordinate of an inputted learning target pattern and luminance at a periphery thereof, calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, acquiring a learning parameter at each coordinate based on a predetermined learning algorithm using the gradient feature amount and the sum difference feature amount, extracting a gradient feature amount including a gradient direction at each coordinate and a gradient intensity value thereof based on an amount of variation between luminance at each coordinate of an inputted identification target pattern and luminance at a periphery thereof, calculating a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum, and identifying a type to which the identification target pattern belongs among one or more types based on the gradient feature amount and the sum difference feature amount that are calculated from the identification target pattern as well as a part of or all learning parameters acquired by the learning unit.

Farther more, a recording medium storing a learning identification program according to one exemplary embodiment of the present invention causes a computer to function as a gradient feature extraction unit which extracts a gradient feature amount including a gradient direction at each coordinate and a gradient intensity value thereof based on an amount of variation between luminance at each coordinate of an inputted learning target pattern and luminance at a periphery thereof, a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and a learning unit which acquires a learning parameter at each coordinate based on a predetermined learning algorithm using the gradient feature amount and the sum difference feature amount; the gradient feature extraction unit to obtain the gradient feature amount including the gradient direction at each coordinate and the gradient intensity value thereof based on an amount of variation between luminance at each coordinate of an inputted identification target pattern and luminance at a periphery thereof; the sum difference feature extraction unit to calculate the predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum; and the identification unit to identify a type to which the identification target pattern belongs among one or more types based on the gradient feature amount and the sum difference feature amount that are calculated from the identification target pattern as well as a part of or all learning parameters acquired by the learning unit.

Effect of the Invention

The learning device, the learning method, the recording medium storing a learning program, the identification device, the identification method, and the recording medium storing an identification program, as well as the learning identification system, the learning identification device, the learning identification method, and the recording medium storing a learning identification program of the present invention can reduce the load on the calculation cost, improve the identification accuracy, and realize the smoothness of the learning process and the identification process.

BRIEF DESCRIPTION OF THE DRAWINGS

FIG. 3A is an explanatory drawing illustrating a sum difference feature amount used for the learning process according to the first exemplary embodiment of the present invention.

FIG. 3B is an explanatory drawing illustrating a sum difference feature amount used for the learning process according to the first exemplary embodiment of the present invention.

FIG. 3C is an explanatory drawing illustrating a sum difference feature amount used for the learning process according to the first exemplary embodiment of the present invention.

FIG. 8 is a flowchart showing a procedure of an identification process according to the first exemplary embodiment of the present invention.

FIG. 9C is a schematic diagram illustrating an example of a method for storing a gradient feature amount according to the second exemplary embodiment of the present invention.

FIG. 10 is a first block diagram showing a configuration of a learning identification system according to the third exemplary embodiment of the present invention.

DESCRIPTION OF EMBODIMENTS

Hereinafter, the exemplary embodiment of the present invention will be described.

Here, the learning device, the learning method, the identification device, the identification method, the learning identification system, the learning identification device, and the learning identification method of the exemplary embodiment mentioned later are realized by a process, means, or a function that is performed by a computer according to an instruction of a program (for example, a learning program, an identification program, and a learning identification program). The program sends a command to each component of the computer and makes it perform a predetermined process and function as shown below. Namely, the learning device, the learning method, the identification device, the identification method, the learning identification system, the learning identification device, and the learning identification method of the exemplary embodiment described later are realized by specific means in which the program and the computer operate in coordination with each other.

Further, all or a part of the program is provided by for example, a magnetic disk, an optical disc, a semiconductor memory, or a recording medium that can be read by an arbitrary computer, the program read from the recording medium is installed in the computer, and it is executed. Furthermore, the program can be directly loaded into the computer through a communication line without using the recording medium.

First Exemplary Embodiment (Learning Device 10)

Figure 1:
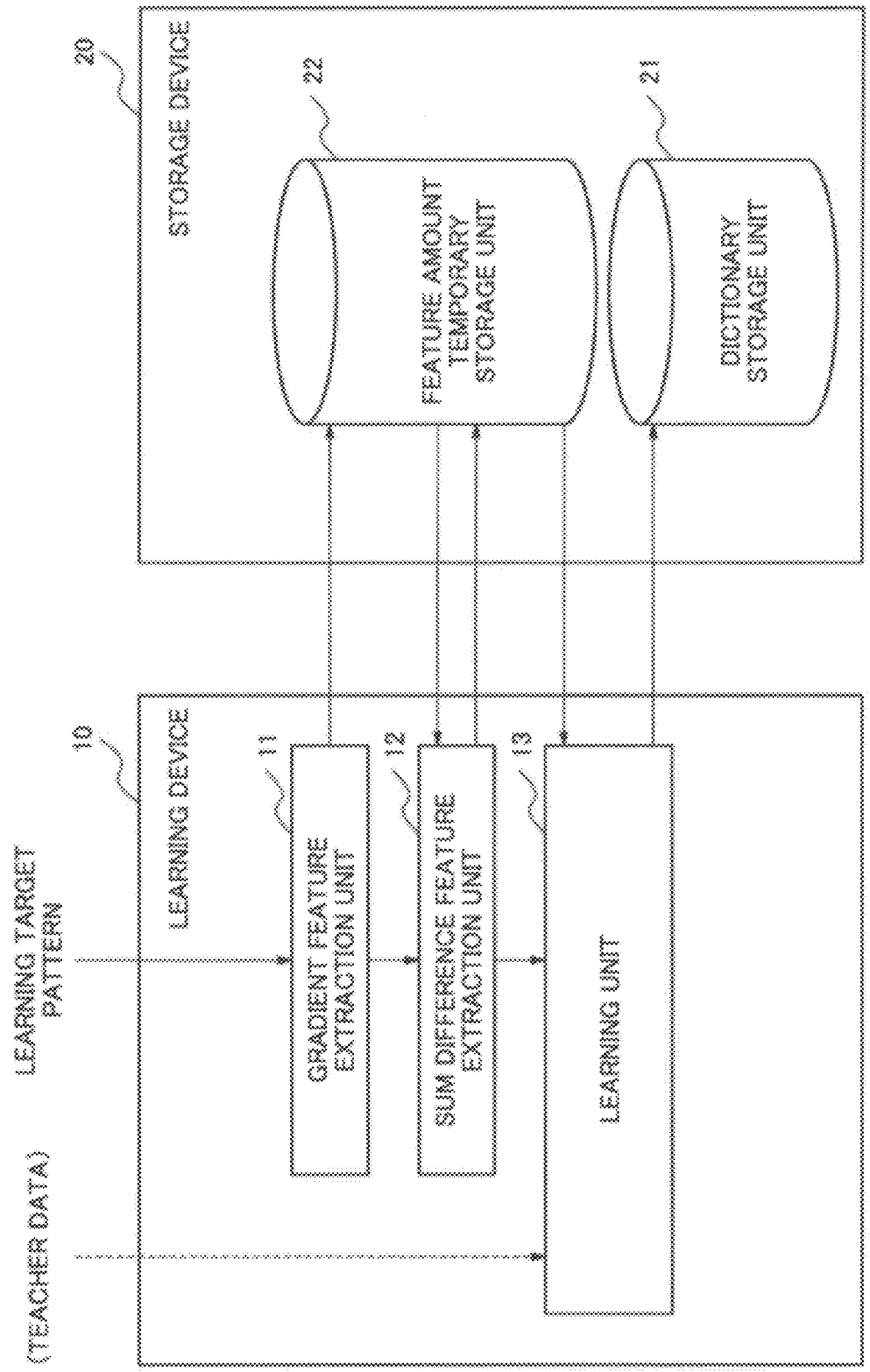
FIG. 1 is a first block diagram showing a configuration of a learning device according to a first exemplary embodiment of the present invention.

FIG. 1 is a first block diagram showing a configuration of a learning device according to the first exemplary embodiment of the present invention.

As shown in FIG. 1, a learning device 10 according to the exemplary embodiment includes a gradient feature extraction unit 11, a sum difference feature extraction unit 12 and a learning unit 13, and the learning device 10 is connected to a storage device 20.

The gradient feature extraction unit 11 extracts a gradient feature amount at each coordinate from an inputted learning target pattern.

The gradient feature extraction unit 11 extracts an amount of variation between the luminance at each coordinate of the learning target pattern and the luminance at the periphery thereof. The gradient feature amount is data extracted by quantifying a direction and intensity (gradient intensity value) of the luminance at each coordinate based on the amount of variation.

Figure 2:
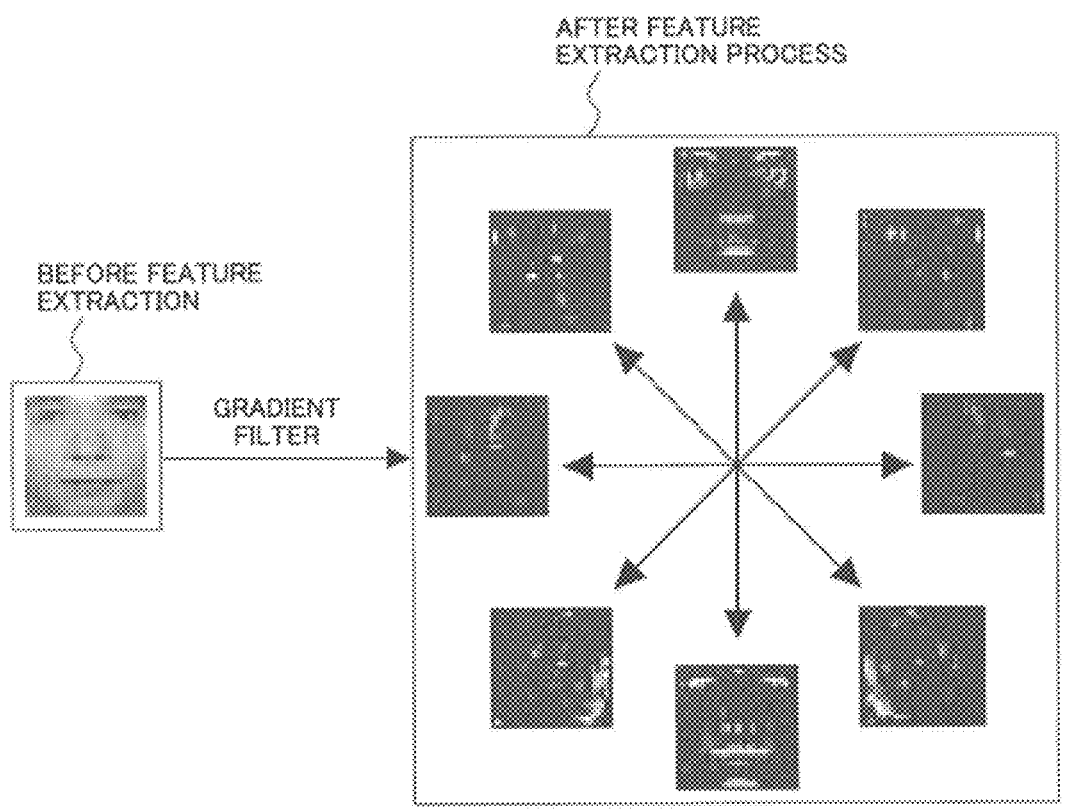
FIG. 2 is an explanatory drawing illustrating a gradient feature amount used for a learning process according to the first exemplary embodiment of the present invention.

FIG. 2 is an explanatory drawing visibly showing the gradient feature amount extracted by the gradient feature extraction unit 11.

As shown in FIG. 2, for example, when a photographic image of a person's face is inputted as the learning target pattern before extracting the feature, the gradient feature extraction unit 11 can separate this image into eight gradients (0 degree, 45 degrees, 90 degrees, 135 degrees, 180 degrees, 225 degrees, 270 degrees, and 315 degrees) by using a gradient filter such as a SOBEL filter or the like and extract the gradient feature amount.

In other words, the gradient feature extraction unit 11 extracts the gradient intensity value for each of the eight gradients that are separately extracted for each pixel. The right-side figure in FIG. 2 schematically shows a result in which the gradient intensity value is extracted for all pixels of a target image (left-side image of FIG. 2).

The gradient feature extraction unit 11 temporarily stores the extracted gradient feature amount in a feature amount temporary storage unit 22 of the storage device 20.

As shown in FIG. 1, the sum difference feature extraction unit 12 gets the gradient feature amount from the feature amount temporary storage unit 22 and calculates the sum difference feature amount. The sum difference feature extraction unit 12 can receive the gradient feature amount from the gradient feature extraction unit 11.

Specifically, the sum difference feature extraction unit 12 adds the gradient intensity values according to the gradient directions included in "a predetermined gradient range" to a certain coordinate of the learning target pattern. The sum difference feature extraction unit 12 calculates the sum difference feature amount by subtracting the gradient intensity values according to the gradient directions included in "the other gradient range" adjacent to the gradient range.

Here, "the predetermined gradient range" is a range in which when the entire range in which all the available gradients are included, that is 360 degrees, is quantized in four or more gradient directions, the gradient feature amounts (the gradient intensity values) according to two or more gradient directions among them are included.

"The other gradient range" is a range which is adjacent to "the predetermined gradient range" and includes the gradient feature amounts according to the gradient directions whose number is equal to the number of gradient directions included in "the predetermined gradient range".

FIG. 3A is a figure schematically showing an example in which the gradient intensity value in each gradient direction is visibly indicated.

FIG. 3B is an explanatory drawing showing a method for illustrating a range of feature that is a calculation target in FIG. 3C. A range represented by a white rectangle indicates a range of the feature value that is an addition target. A range represented by a black rectangle indicates a range of the feature value that is characterized by a subtraction target.

FIG. 3C is an explanatory drawing for explaining a sum difference feature amount when the number of quantized gradient directions is eight.

In FIG. 3C, the range (width) of the gradient direction that is the addition target or the subtraction target is indicated in the row headings and an arrangement of the range of the gradient direction that is the addition target or the subtraction target is indicated in the column headings.

For example, when the width is "2" and θ=45 degrees, there are eight types of arrangements with respect to the addition (+) and subtraction (−) of the gradient intensity value: (1) "(+): 4θ and 3θ" and "(−): 2θ and θ", (2) "(+): 5θ and 4θ" and "(−): 3θ and 2θ", (3) "(+): 6θ and 5θ" and "(−): 4θ,3θ", (4) "(+): 7θ and 6θ" and "(−): 5θ and 4θ", (5) "(+): 0 and 7θ" and "(−): 6θ and 5θ", (6) "(+): θ and 0" and "(−): 7θ and 6θ", (7) "(+): 2θ and θ" and "(−): 0 and 7θ", and (8) "(+): 3θ and 2θ" and "(−): θ and 0".

The sum difference feature extraction unit 12 calculates the sum difference feature amount by performing addition and subtraction to the gradient intensity value according to each of these combinations.

For example, when the gradient intensity value according to the arbitrary gradient direction (θn) is denoted by E(θn), the sum difference feature amount of the arrangement (1) can be calculated by the following method. Namely, the sum difference feature extraction unit 12 can obtain one of the sum difference feature amounts with respect to the pixel by performing a calculation process of E(4θ)+E(3θ)−(E(2θ)+E(θ)). The sum difference feature extraction unit 12 can calculate the required sum difference feature amount with respect to the pixel by performing the calculation process for the arrangements (1) to (8). In other words, in this case, the sum difference feature extraction unit 12 calculates eight sum difference feature amounts with respect to one pixel.

Additionally, the sum difference feature extraction unit 12 performs this process with respect to all pixels of the learning target pattern.

Further, "the gradient range" mentioned above may be set or changed according to the user's input operation.

Specifically, the learning device 10 can arbitrarily set "the predetermined gradient range" or "the other gradient range" by setting the number of the gradient directions included in this gradient range (a function of gradient feature number setting means of the present invention).

For example, when the width is set to "3", the sum difference feature extraction unit 12 calculates sixteen sum difference feature amounts: eight sum difference feature amounts obtained by performing addition and/or subtraction of the gradient intensity values when the width is "3" and eight sum difference feature amounts calculated by performing addition/subtraction of the gradient intensity values when the width is "2".

Similarly, when the width is set to "4", the sum difference feature extraction unit 12 obtains twenty-four sum difference feature amounts: eight sum difference feature amounts obtained by performing addition and/or subtraction of the gradient intensity values when the width is "4", eight sum difference feature amounts calculated by performing addition and/or subtraction of the gradient intensity values when the width is "3", and eight sum difference feature amounts calculated by performing addition and/or subtraction of the gradient intensity values when the width is "2".

Thus, the sum difference feature extraction unit 12 can adjust the number of the sum difference feature amounts used for the learning process by changing the range (width) of the addition and/or the subtraction for calculating the sum difference feature amount.

Further, the sum difference feature extraction unit 12 calculates the sum difference feature amount with respect to all pixels and temporarily stores the calculated sum difference feature amounts in the feature amount temporary storage unit 22 of the storage device 20.

As shown in FIG. 1, the learning unit 13 gets the gradient feature amount and the sum difference feature amount from the feature amount temporary storage unit 22 and acquires the learning parameter for an identification process based on a predetermined learning algorithm. The learning unit 13 can receive these gradient feature amount and sum difference feature amount via the gradient feature extraction unit 11 and the sum difference feature extraction unit 12.

Further, as shown in FIG. 1, the learning unit 13 can acquire the learning parameter by using not only the gradient feature amount and the sum difference feature amount but also the predetermined teacher data.

The teacher data is data indicating a correct identification result (output) to the sample data (input). Specifically, the teacher data is either an arithmetic expression or the learning parameter for deriving an output value from an input value or both of them.

Here, the learning unit 13 can acquire the learning parameter by using not only the specific learning algorithm but also various learning algorithms.

For example, when the multi-layer perceptron which is one kind of neural networks is used, the learning unit 13 acquires "a connection weight" between respective nodes as the learning parameter.

When the generalized learning vector quantization (GLVQ) is used as the learning algorithm, the learning unit 13 can acquire "a reference vector (prototype)" as the learning parameter.

When a support vector machine (SVM) is used as the learning algorithm, the learning unit 13 can acquire a selected "support vector" as the learning parameter.

The learning unit 13 stores the acquired learning parameter in a dictionary storage unit 21.

The learning parameter stored in the dictionary storage unit 21 is used for the identification process described later.

Figure 4:
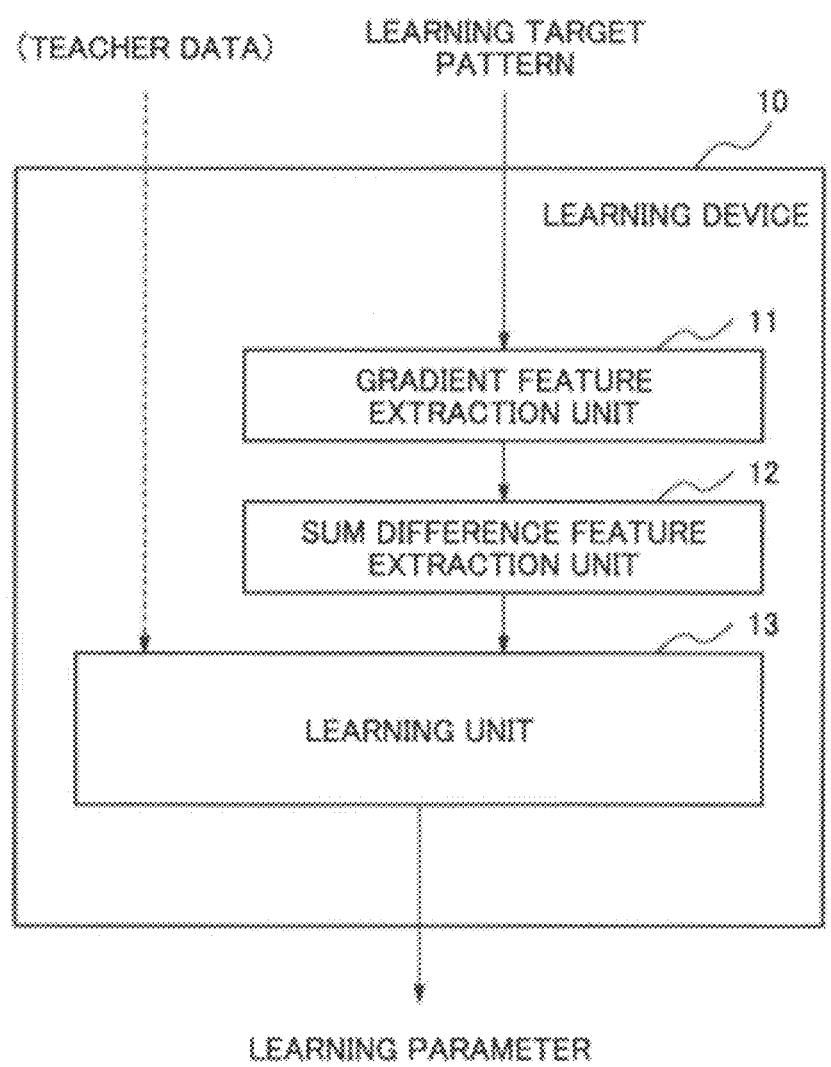
FIG. 4 is a second block diagram showing a configuration of a learning device according to the first exemplary embodiment of the present invention.

Further, as shown in FIG. 4, the learning device 10 may have a configuration in which the storage device 20 is not included therein.

In this case, the gradient feature extraction unit 11 can directly output the extracted gradient feature amount to the sum difference feature extraction unit 12 and the learning unit 13. The sum difference feature extraction unit 12 can directly output the calculated sum difference feature amount to the learning unit 13 and send the gradient feature amount received from the gradient feature extraction unit 11 to the learning unit 13.

The learning unit 13 outputs the learning parameter acquired based on the gradient feature amount and the sum difference feature amount (including the teacher data when the teacher data is used) to the identification device.

(Identification Device 30)

Figure 5:
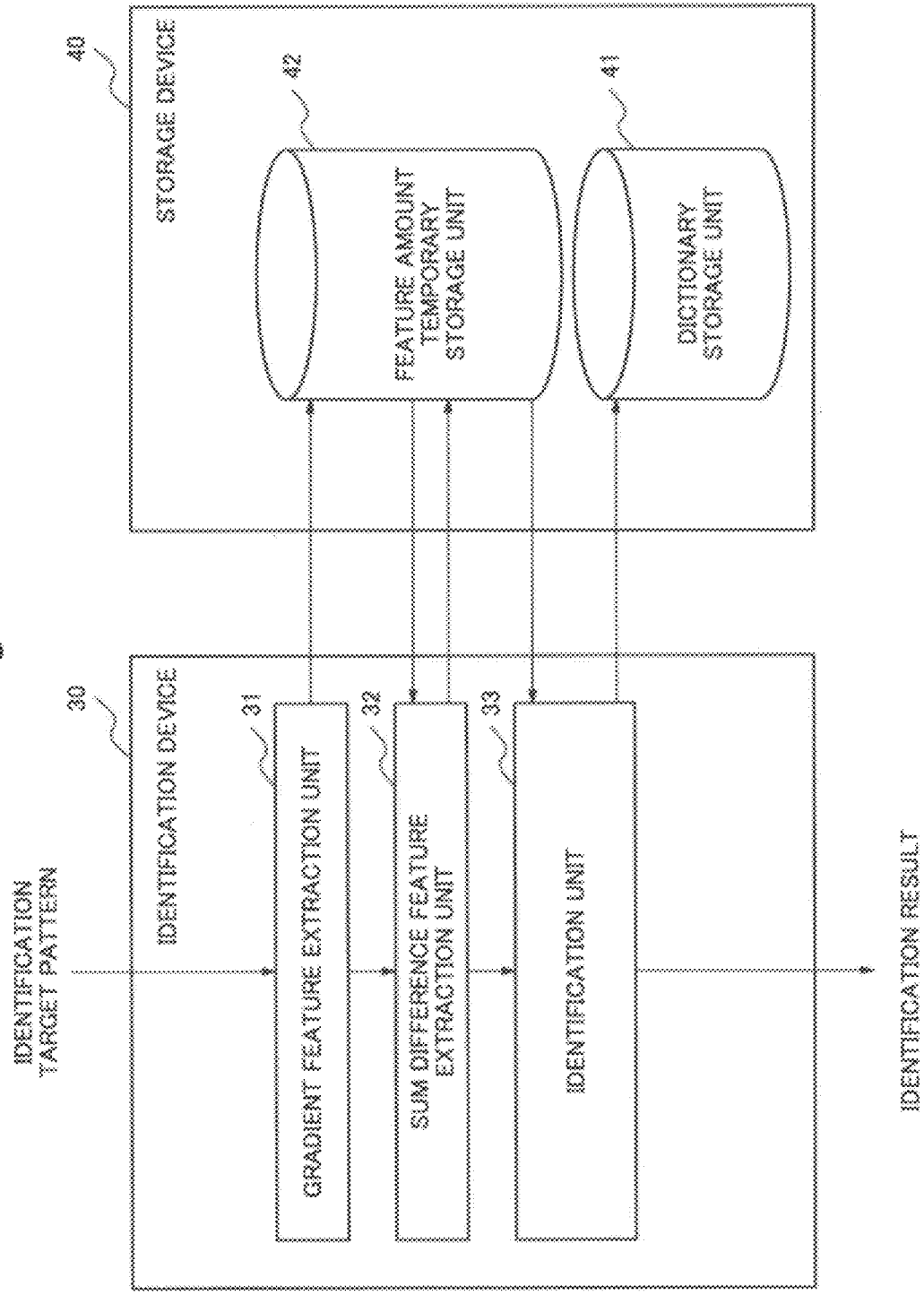
FIG. 5 is a first block diagram showing the configuration of the identification device according to the first exemplary embodiment of the present invention.

As shown in FIG. 5, an identification device 30 includes a gradient feature extraction unit 31, a sum difference feature amount extraction unit 32, and an identification unit 33.

The gradient feature extraction unit 31 extracts the gradient feature amount at each coordinate from the inputted identification target pattern.

The gradient feature extraction unit 31 extracts an amount of variation between the luminance at each coordinate of the identification target pattern and the luminance at the periphery thereof. The gradient feature amount is data extracted by quantifying a direction and intensity (gradient intensity value) of the luminance at each coordinate based on the amount of variation.

Namely, the gradient feature extraction unit 31 performs an operation that is the same as that of the gradient feature extraction unit 11 of the learning device 10.

Further, the gradient feature extraction unit 31 can extract only the specific gradient feature amount that is judged to be useful for the identification process. For example, the gradient feature extraction unit 31 excludes the gradient feature amount that is judged to be not useful for the identification by a statistical method or the like and attaches an identification code that is not useful for the identification to the predetermined coordinate or the pixel in the identification target pattern. By this, it is possible not to extract the gradient feature amount that is not useful for the identification.

The gradient feature extraction unit 31 temporarily stores the extracted gradient feature amount in a feature amount temporary storage unit 42 of a storage device 40.

As shown in FIG. 5, the sum difference feature extraction unit 32 gets the gradient feature amount from the feature amount temporary storage unit 42 and calculates the predetermined sum difference feature amount. The sum difference feature extraction unit 32 can directly receive the gradient feature amount from the gradient feature extraction unit 31.

Namely, the sum difference feature extraction unit 32 performs an operation that is the same as that of the sum difference feature extraction unit 12 in the learning device 10.

For example, when the width of "the predetermined gradient range" and "the other gradient range" is set to "3" in the sum difference feature extraction unit 12 of the learning device 10, usually, the sum difference feature extraction unit 32 of the identification device 30 calculates the sum difference feature amount by using the gradient feature amount included in the gradient range having the same width. Specifically, in this case, the sum difference feature extraction unit 32 adds the gradient intensity values according to three gradient directions and subtracts the gradient intensity values according to three other gradient directions from the calculated sum to obtain the sum difference feature amount. The sum difference feature extraction unit 32 adds the gradient intensity values according to two gradient directions and subtracts the gradient intensity values according to two other gradient directions from the calculated sum to obtain the sum difference feature amount.

However, as a result of the learning process by the learning device 10, when the gradient feature amount is judged to be not useful for the identification when the width of the gradient range is "3", the sum difference feature extraction unit 32 can obtain the sum difference feature amount based on only the gradient range whose width is "2". In other words, in this case, the sum difference feature extraction unit 32 adds the gradient intensity values according to two gradient directions and subtracts the gradient intensity values according to two other gradient directions from the calculated sum to obtain the sum difference feature amount.

Further, by using a method that is the same as the method performed by the gradient feature extraction unit 31 described above, the sum difference feature extraction unit 32 can obtain only the specific sum difference feature amount that is judged to be useful for the identification.

As a result, the learning device 10 according to the exemplary embodiment can reduce the calculation cost for the identification and realize a quick identification process.

Further, the sum difference feature extraction unit 32 temporarily stores the calculated sum difference feature amount in the feature amount temporary storage unit 42 of the storage device 40.

As shown in FIG. 5, the identification unit 33 gets the gradient feature amount and the sum difference feature amount from the feature amount temporary storage unit 42. The identification unit 33 gets the learning parameter from a dictionary storage unit 41 and outputs information indicating a type to which the identification target pattern belongs among one or more types (predetermined classification/category/class or the like) as an identification result based on these learning parameters.

For example, the identification unit 33 acquires the Euclidean distance between the feature vector composed of the gradient feature amount and the sum difference feature amount that are extracted from the identification target pattern and a plurality of reference vectors for the learning parameters and identifies that the identification target pattern belongs to the classification, the category or the class to which the reference vector whose Euclidean distance is the shortest distance is assigned.

Here, the identification unit 33 can extract only the learning parameter that is judged to be useful for the identification among the learning parameters stored in the dictionary storage unit 41 and use it for the identification process. For example, the identification unit 33 can realize the process by attaching the identification code to the learning parameter that is judged to be useful for the identification in advance based on the identification result extracted through the actual identification process.

Figure 6:
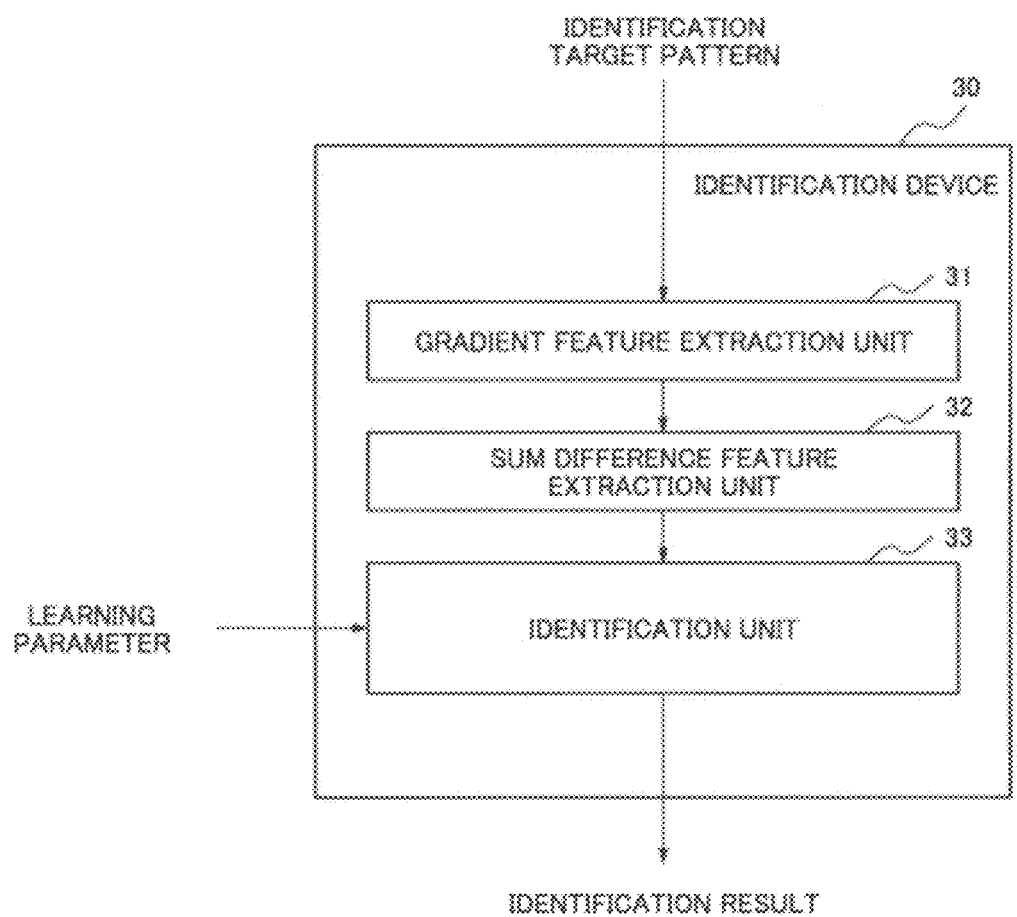
FIG. 6 is a second block diagram showing the configuration of the identification device according to the first exemplary embodiment of the present invention.

Further, as shown in FIG. 6, the identification device 30 may have a configuration in which the storage device 40 is not included therein.

In this case, the gradient feature extraction unit 31 can directly output the extracted gradient feature amount to the sum difference feature extraction unit 32 or the identification unit 33. The sum difference feature extraction unit 32 can directly output the calculated sum difference feature amount to the identification unit 33.

The sum difference feature extraction unit 32 can send the gradient feature amount received from the gradient feature extraction unit 31 to the identification unit 33.

The learning unit 13 outputs the identification result based on the gradient feature amount, the sum difference feature amount, and the learning parameter received from the learning device (not shown) or the like.

(Storage Device 20 (40))

The storage device 20 shown in FIG. 1 and the storage device 40 shown in FIG. 5 are storage means composed of a hard disk, a semiconductor memory, or the like.

As shown in these figures, the storage device 20 (40) includes the dictionary storage unit 21 (41) and the feature amount temporary storage unit 22 (42).

The dictionary storage unit 21 (41) stores the learning parameter acquired through the learning process. The learning parameter stored in the dictionary storage unit 21 (41) is used for the identification process.

The feature amount temporary storage unit 22 stores the gradient feature amount extracted by the gradient feature extraction unit 11 and the sum difference feature amount calculated by the sum difference feature extraction unit 12 in the learning device 10.

The feature amount temporary storage unit 42 stores the gradient feature amount extracted by the gradient feature extraction unit 31 and the sum difference feature amount calculated by the sum difference feature extraction unit 32 in the identification device 30.

Next, the learning method in the learning device and the identification method in the identification device that have the above-mentioned configuration will be described with reference to FIG. 7 and FIG. 8.

Figure 7:
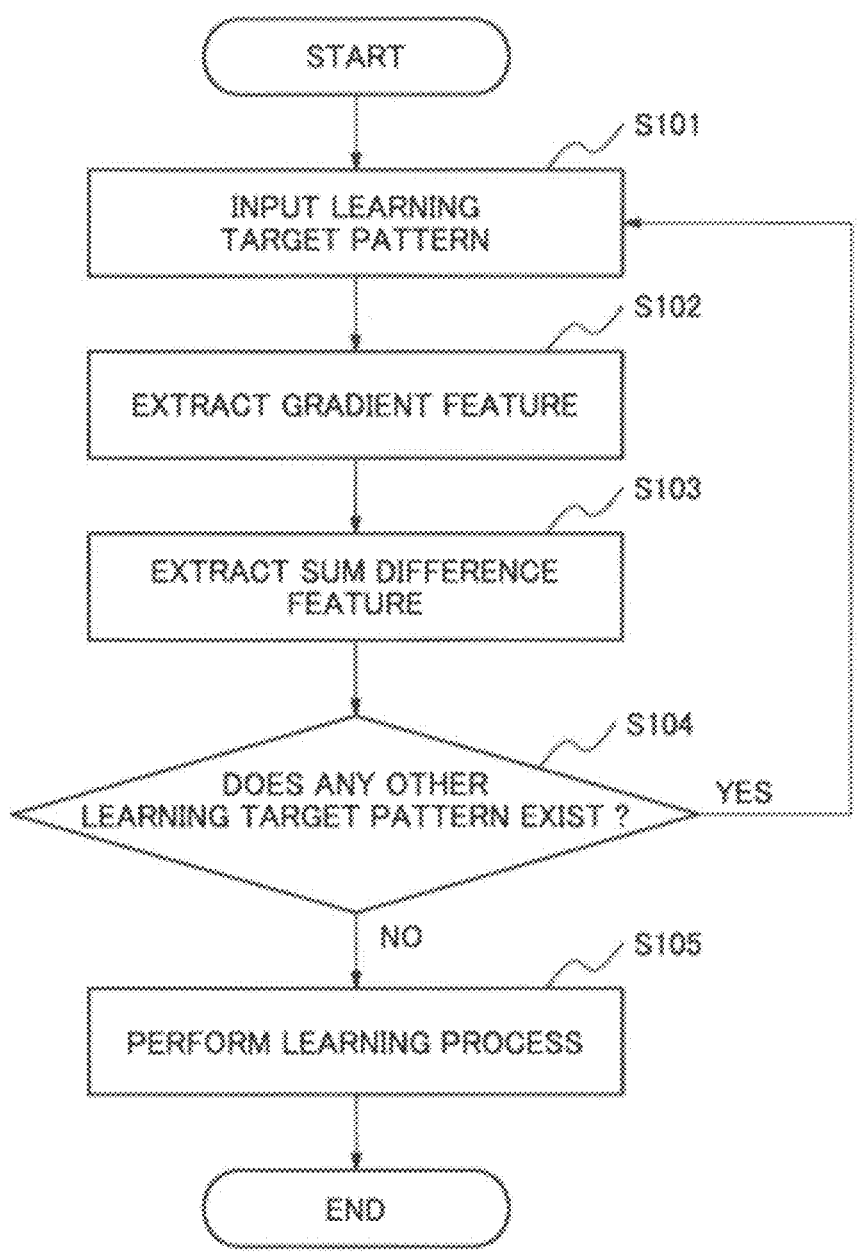
FIG. 7 is a flowchart showing a procedure of the learning process according to the first exemplary embodiment of the present invention.

FIG. 7 is a flowchart showing the learning method according to the exemplary embodiment.

FIG. 8 is a flowchart showing the identification method according to the exemplary embodiment.

(Learning Method)

As shown in FIG. 7, in the learning method according to the exemplary embodiment, first, the learning device 10 inputs the learning target pattern via an input unit (not shown) (S101).

Next, the gradient feature extraction unit 11 extracts the gradient feature amount from the inputted learning target pattern (S102).

Specifically, the gradient feature extraction unit 11 extracts the gradient feature amount composed of the gradient direction at each coordinate and the gradient intensity value thereof based on the amount of variation between the luminance at each coordinate of the inputted learning target pattern and the luminance at the periphery thereof.

The gradient feature extraction unit 11 stores the extracted gradient feature amount in the feature amount temporary storage unit 22 of the storage device 20.

Next, the sum difference feature extraction unit 12 gets the gradient feature amount from the feature amount temporary storage unit 22 and calculates the sum difference feature amount (S103).

Specifically, the sum difference feature extraction unit 12 adds the gradient intensity values according to the gradient directions included in the predetermined gradient range based on the gradient feature amount extracted from the learning target pattern. The sum difference feature extraction unit 12 calculates the sum difference feature amount by subtracting the gradient intensity values according to the gradient directions included in the other gradient range adjacent to the gradient range.

The sum difference feature extraction unit 12 performs the above-mentioned process to all the pixels of the learning target pattern.

Further, the sum difference feature extraction unit 12 stores the obtained sum difference feature amount in the feature amount temporary storage unit 22.

Next, the learning device 10 determines whether or not other learning target pattern to be learned exists (S104).

When the other learning target pattern to be learned exists (S104: YES), the learning device 10 performs a similar process (S101 to S103) to the other learning target pattern. Namely, the learning device 10 repeats the processes from S101 to S103 by the number of times that is equal to the number of the learning target patterns.

When the other learning target pattern to be learned does not exist (S104: NO), the learning unit 13 performs the learning process (S105).

Specifically, the learning unit 13 acquires the learning parameter based on the predetermined learning algorithm using the gradient feature amount and the sum difference feature amount that are taken out from the feature amount temporary storage unit 22.

Further, at that time, the learning unit 13 can perform the learning process by adding the predetermined teacher data.

In the exemplary embodiment, the learning unit 13 stores the acquired learning parameter in the dictionary storage unit 41 of the storage device 40 connected to the identification device 30.

Here, the procedure of the above-mentioned learning process can be arbitrarily changed.

For example, when the learning process in which the learning target pattern is sequentially inputted like the generalized learning vector quantization (GLVQ) is performed, the processing order of step S104 and step S105 can be interchanged. Namely, a series of processes of: inputting the learning target pattern→extracting the gradient feature amount→extracting the sum difference feature amount→performing the learning process may be repeatedly performed according to the number of the learning patterns.

(Identification Method)

As shown in FIG. 8, in an identification method according to the exemplary embodiment, first, the identification device 30 inputs the identification target pattern via the input unit (not shown) (S201).

Next, the gradient feature extraction unit 31 extracts the gradient feature amount from the inputted identification target pattern (S202).

Specifically, the gradient feature extraction unit 31 extracts the gradient feature amount composed of the gradient direction at each coordinate and the gradient intensity value thereof based on the amount of variation between the luminance at each coordinate of the inputted identification target pattern and the luminance at the periphery thereof.

The gradient feature extraction unit 31 stores the extracted gradient feature amount in the feature amount temporary storage unit 42 of the storage device 40.

Next, the sum difference feature extraction unit 32 gets the gradient feature amount from the feature amount temporary storage unit 42 and calculates the sum difference feature amount (S203).

Specifically, the sum difference feature extraction unit 32 adds the gradient intensity values according to the gradient directions included in the predetermined gradient range based on the gradient feature amount extracted from the identification target pattern. The sum difference feature extraction unit 32 calculates the sum difference feature amount by subtracting the gradient intensity values according to the gradient directions included in the other gradient range adjacent to the gradient range.

The sum difference feature extraction unit 32 performs the above-mentioned process to all the pixels of the identification target pattern.

Further, the sum difference feature extraction unit 32 stores the calculated sum difference feature amount in the feature amount temporary storage unit 42.

Next, the identification unit 33 gets the gradient feature amount and the sum difference feature amount from the feature amount temporary storage unit 42 and the learning parameter stored at the step of the learning process from the dictionary storage unit 41. The identification unit 33 identifies a type to which the identification target pattern belongs among one or more types based on these data (S204).

This identification result may be outputted by a method of displaying, printing, or the like.

As described above, the learning device 10 of the exemplary embodiment extracts the gradient feature amount at each coordinate based on the inputted learning target pattern and the sum difference feature amount based on this gradient feature amount, and acquires the learning parameter based on the predetermined learning algorithm.

For this reason, the learning device 10 of the exemplary embodiment can extract the learning parameter based on the specific feature amount by performing a simple calculation process such as addition and subtraction.

Accordingly, the learning device 10 of the exemplary embodiment can reduce the calculation cost for the learning process and realize the smooth learning process.

Further, the identification device 30 of the exemplary embodiment obtains the gradient feature amount at each coordinate based on the inputted identification target pattern and the sum difference feature amount based on this gradient feature amount, compares these feature amounts with the learning parameter extracted (by the above-mentioned learning device or the like) in advance, and thereby, performs the identification of the identification target pattern.

Therefore, the identification device 30 of the exemplary embodiment can reduce the calculation cost for the identification process and smoothly get the identification result.

Accordingly, by using the learning device 10 or the identification device 30 according to the exemplary embodiment, although the learning parameter is the specific feature amount, the learning parameter useful for the identification can be effectively acquired by performing the simple calculation process such as addition or subtraction and the identification result can be smoothly calculated.

Namely, the learning device 10 or the identification device 30 according to the exemplary embodiment does not need to extract a large number of feature amounts and learning parameters for securing the identification accuracy by the learning process. In the learning device 10 or the identification device 30 according to the exemplary embodiment, because the identification process is performed, the complicated calculation process is not needed and whereby, the overall calculation cost can be reduced.

Additionally, in the learning device 10 or the identification device 30 of the exemplary embodiment, the amount of the gradient feature required for the learning process and the identification process can be adjusted.

For example, when the wide gradient range is set in the learning device 10 or the identification device 30 of the exemplary embodiment, many learning parameters can be acquired when performing the learning process and whereby, the identification accuracy in the identification process can be further improved.

On the other hand, when the narrow gradient range is set in the learning device 10 or the identification device 30 of the exemplary embodiment, the calculation cost when performing the learning process and the identification process can be suppressed.

Therefore, because a user can freely change the gradient range, the user can adjust a balance between the identification accuracy and the calculation cost.

Further, the identification device 30 of the exemplary embodiment can perform the identification process in which only the learning parameter required for the identification among the learning parameters acquired at the step of the learning process is used.

Specifically, in the identification device 30 of the exemplary embodiment, the gradient feature extraction unit 31 extracts the gradient feature amount used for the identification, the sum difference feature extraction unit 32 calculates only the sum difference feature amount used for the identification, the identification unit 33 compares these feature amounts with the learning parameter, and whereby, the identification process can be performed.

Further, the identification device 30 of the exemplary embodiment can take out only the learning parameter used for the identification among the learning parameters stored in the dictionary storage unit and use it for the comparison with the gradient feature amount and the sum difference feature amount.

As a result, the identification device 30 of the exemplary embodiment can suppress the calculation cost for the identification process and realize the smooth identification process.

Second Exemplary Embodiment

Next, a learning device according to a second exemplary embodiment of the present invention will be described.

The learning device 10 according to the exemplary embodiment is characterized by a storage method used when the gradient feature amount is stored in the feature amount temporary storage unit 22. The other configuration, operation/effect, or the like of the second exemplary embodiment is the same as that of the first exemplary embodiment. Therefore, the detailed explanation will be omitted.

Hereinafter, the method for storing the gradient feature amount according to the exemplary embodiment will be described with reference to FIGS. 9A to 9C.

Figure 9A:
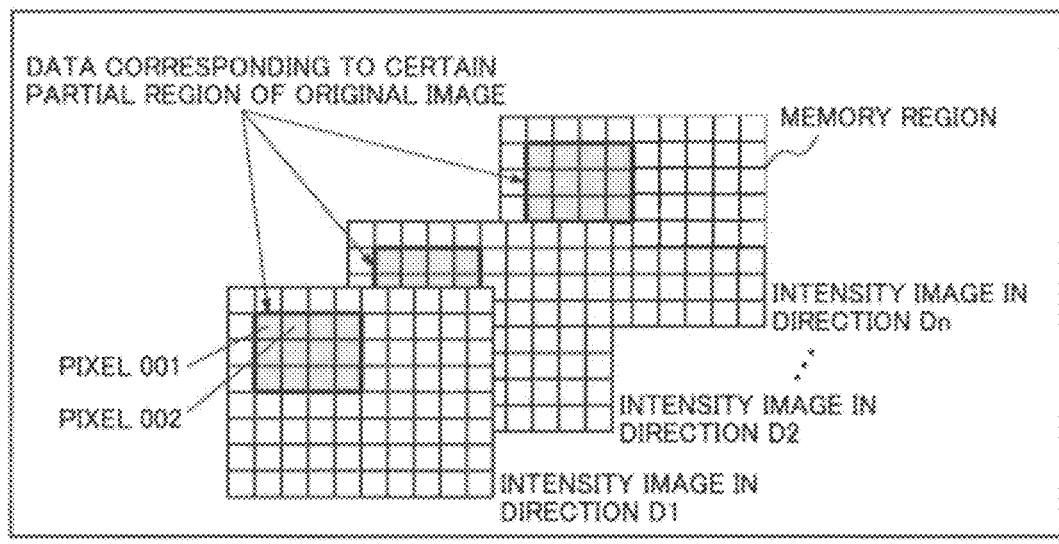
FIG. 9A is a schematic diagram illustrating a storage method by which data of a gradient feature amount is simply allocated according to the second exemplary embodiment of the present invention.
Figure 9B:
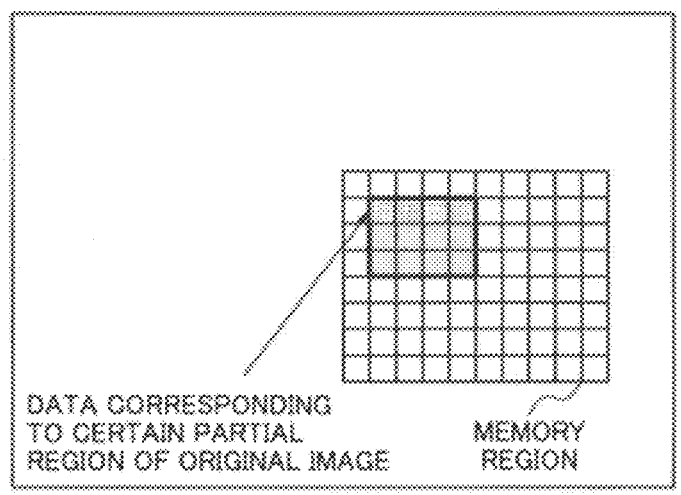
FIG. 9B is a schematic diagram illustrating a storage method by which data of a gradient feature amount is optimally allocated according to the second exemplary embodiment of the present invention.

FIGS. 9A to 9C are the explanatory drawings illustrating the method for storing the gradient feature amount according to the exemplary embodiment.

When the feature amount temporary storage unit 22 in the learning device according to the exemplary embodiment performs the learning process, it separately stores the gradient feature amounts that are targets of addition or subtraction for calculating one sum difference feature amount among the gradient feature amounts composed of the gradient direction of the luminance at each coordinate and the gradient intensity value thereof that are extracted by the gradient feature extraction unit 11 in the same storage region or neighboring regions.

Namely, the feature amount temporary storage unit 22 does not store the gradient feature amount extracted with respect to a certain pixel of the learning target pattern in a hierarchical way or a disordered way (refer to FIG. 9A) and stores the gradient feature amount so that the calculation targets of the sum difference feature amount are arranged at the same or neighboring addresses (regions) (refer to FIG. 9B).

For example, in an example of FIG. 9C, the feature amount temporary storage unit 22 stores the respective gradient intensity values of the gradient directions (directions D1 to Dn) at a pixel 001 in a storage region having an address of #001.

Further, the feature amount temporary storage unit 22 stores the respective gradient intensity values of the gradient directions at a pixel 002 in a storage region having an address of #002 (the same operation is performed up to a pixel N (N is the number of corresponding pixels of the target pattern)).

Namely, the feature amount temporary storage unit 22 stores the gradient feature amount so that the calculation targets of the sum difference feature amount are stored in the storage regions whose addresses are neighboring to each other (or the same) on the storage region of the memory.

Therefore, the learning device 10 of the exemplary embodiment can perform the addition and the subtraction of the gradient intensity value at high speed when performing the sum difference feature extraction process in comparison with a case in which the gradient feature amounts are disorderly stored and whereby, a period (time) required for performing the learning process can be shortened.

Further, in the exemplary embodiment, the explanation has been given about the learning device 10. However, the operation/effect of the identification device 30 is a similar to that of the learning device 10 because the configurations of the both devices are similar to each other.

Third Exemplary Embodiment

Next, a learning identification system according to a third exemplary embodiment of the present invention will be described with reference to FIG. 10 and FIG. 11.

Figure 11:
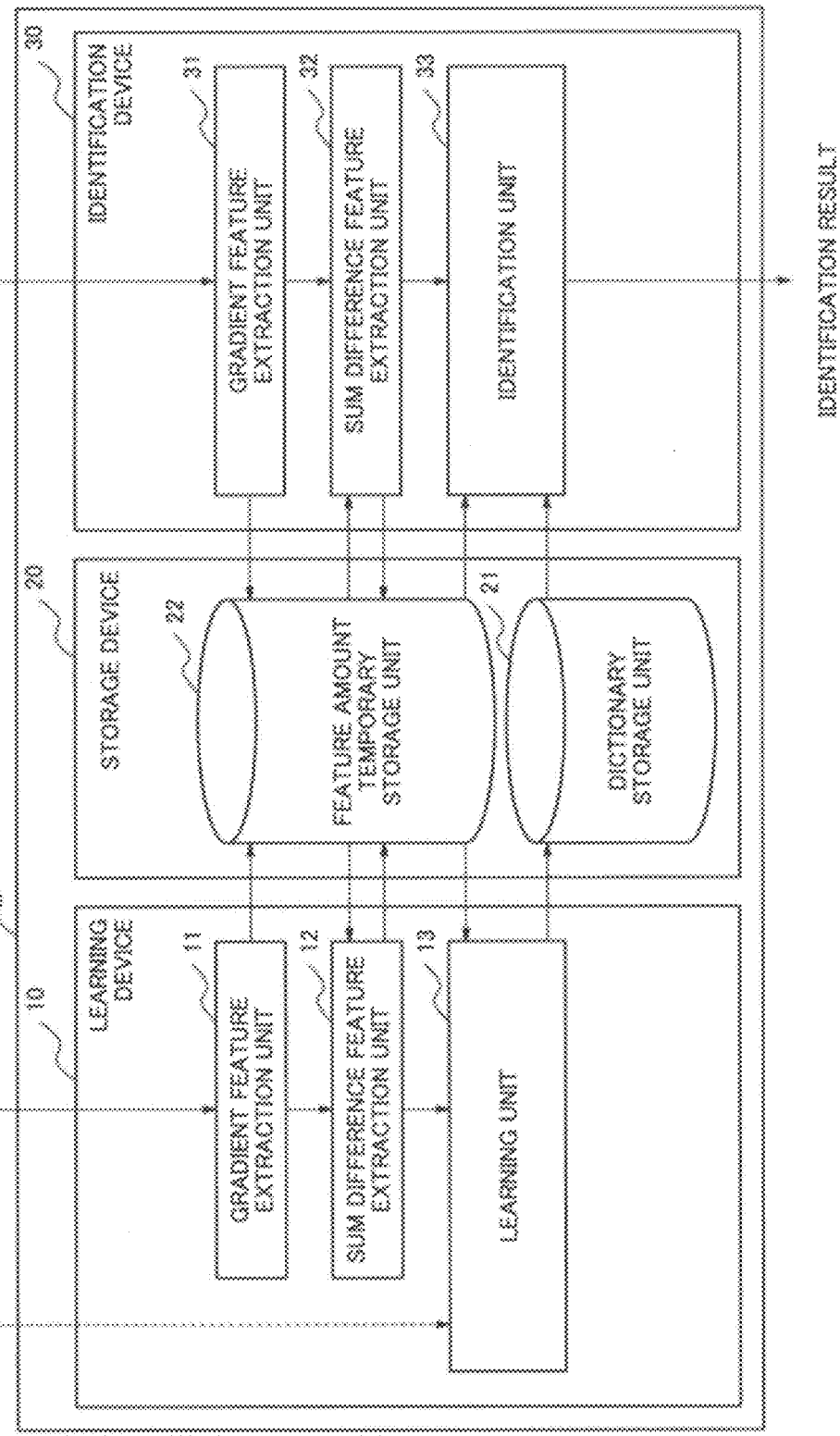
FIG. 11 is a second block diagram showing a configuration of a learning identification system according to the third exemplary embodiment of the present invention.

FIG. 10 and FIG. 11 are block diagrams showing a configuration of the learning identification system according to the exemplary embodiment.

As shown in these figures, a learning identification system 90 according to the exemplary embodiment includes the learning device 10 and the identification device 30.

Therefore, the operation/effect of the learning identification system 90 according to the exemplary embodiment is similar to that of the learning device 10 and the identification device 30 shown in the first exemplary embodiment. Additionally, because the learning identification system 90 is composed of the learning device 10 and the identification device 30, it can be integrally provided. Therefore, it has excellent usability.

Specifically, a learning identification system 90*a* shown in FIG. 10 can be used when the learning process and the identification process are performed in real time. For example, the learning identification system 90*a* can be applied to an embodiment in which the learning device 10 continuously inputs the learning pattern and the teacher data and performs the learning process and at the same time, the identification device 30 performs the identification process of the identification target pattern.

In a learning identification system 90*b* shown in FIG. 11, the learning device 10 and the identification device 30 share the storage device 20. Therefore, because the learning device 10 and the identification device 30 can be configured so as not to include the storage device therein, the cost of the learning identification system 90*b* can be reduced in comparison with a case in which the learning device 10 and the identification device 30 include the storage device, respectively.

Fourth Exemplary Embodiment

Next, a learning identification device according to a fourth exemplary embodiment of the present invention will be described with reference to FIG. 12 and FIG. 13.

Figure 12:
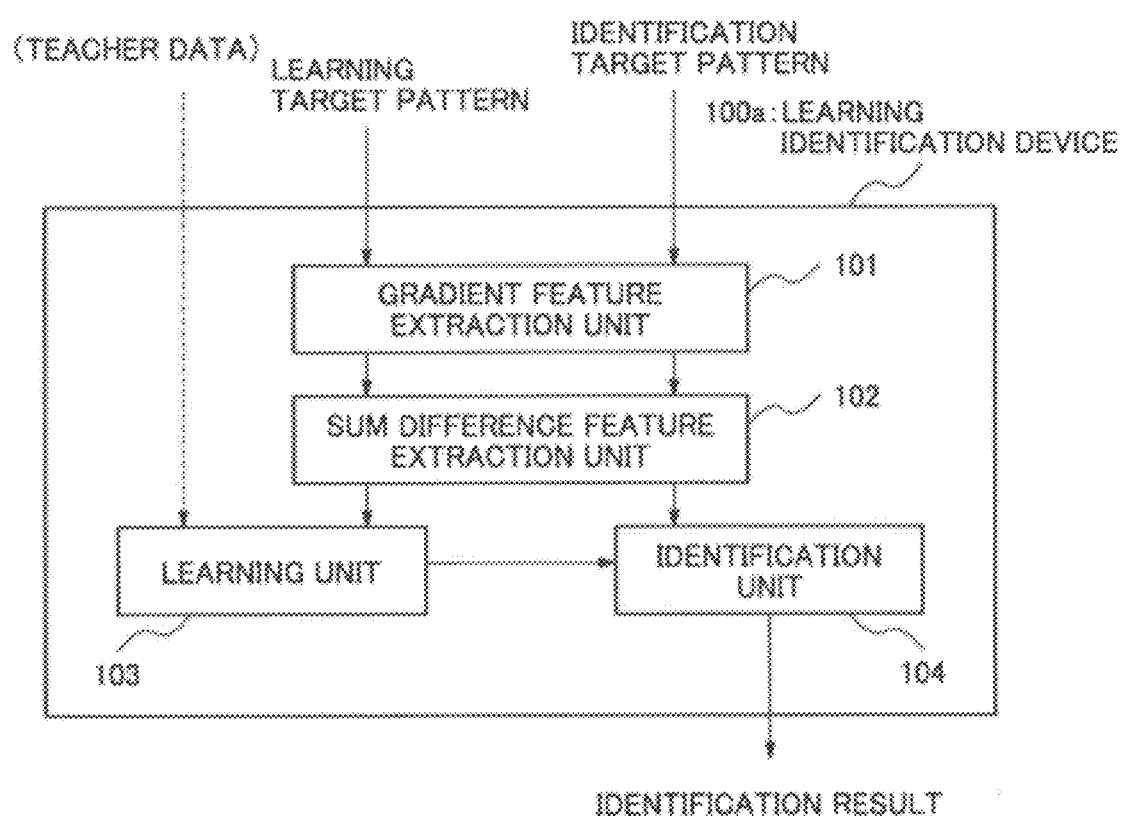
FIG. 12 is a first block diagram showing a configuration of a learning identification device according to the fourth exemplary embodiment of the present invention.
Figure 13:
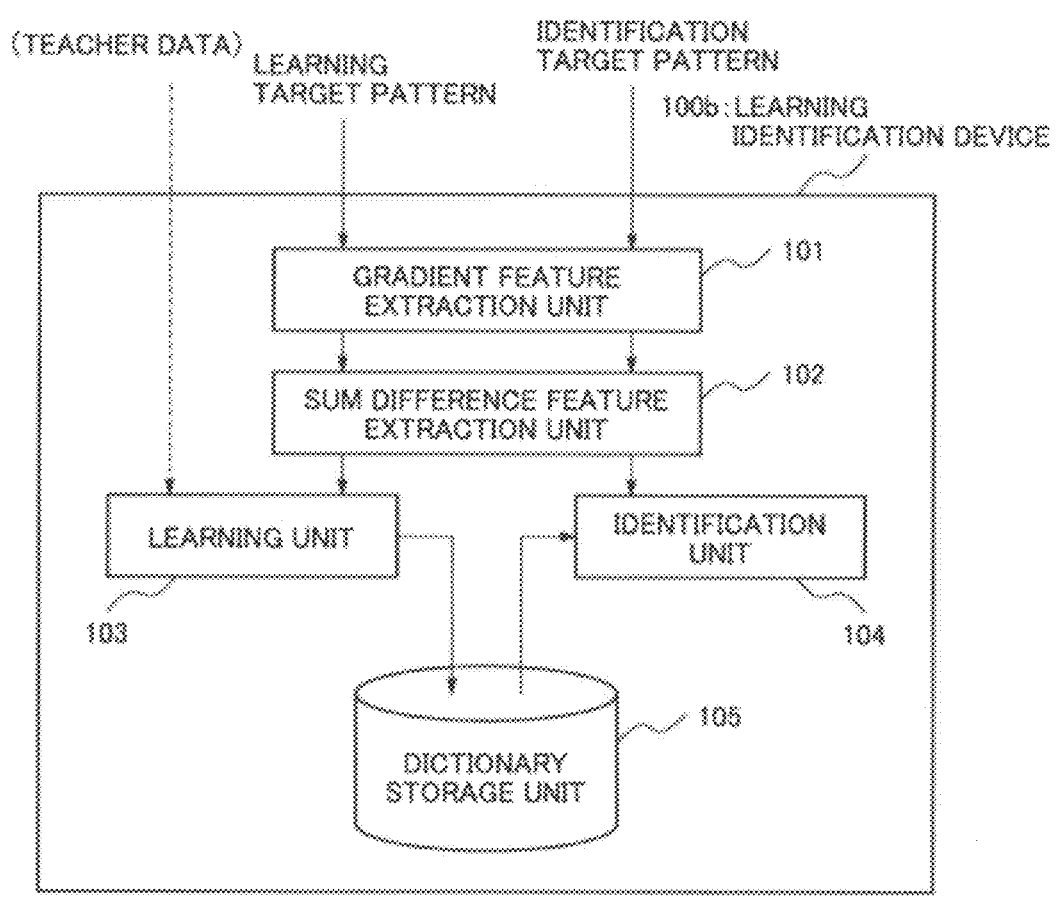
FIG. 13 is a second block diagram showing a configuration of a learning identification device according to the fourth exemplary embodiment of the present invention.

FIG. 12 and FIG. 13 are block diagrams showing a configuration of the learning identification device according to the exemplary embodiment.

A learning identification device 100 according to the exemplary embodiment unifies the learning device 10 and the identification device 20.

Specifically, a learning identification device 100*a* shown in FIG. 12 corresponds to the learning identification system 90*a* shown in FIG. 10.

A learning identification device 100*b* shown in FIG. 13 corresponds to the learning identification system 90*b* shown in FIG. 11.

Accordingly, the other configuration, operation/effect, or the like of the fourth exemplary embodiment is the same as that of the third exemplary embodiment.

However, in the learning identification device 100 according to the exemplary embodiment, the gradient feature extraction unit and the sum difference feature extraction unit are shared for both the learning process and the identification process. This is different from the above-mentioned exemplary embodiment.

For this reason, the learning identification device 100 according to the exemplary embodiment can further reduce the cost in comparison with the learning identification system shown in the third exemplary embodiment.

The explanation has been given about the learning device, the learning method, the recording medium storing a learning program, the identification device, the identification method, and the recording medium storing an identification program, as well as the learning identification system, the learning identification device, the learning identification method, and the recording medium storing a learning identification program of the present invention by showing the exemplary embodiment. However, the device, the system, the method, and the recording medium storing a program according to the present invention are not limited to only the above-mentioned exemplary embodiment and it is not necessary to say that various changes can be made within the scope of the present invention.

Figure 14:
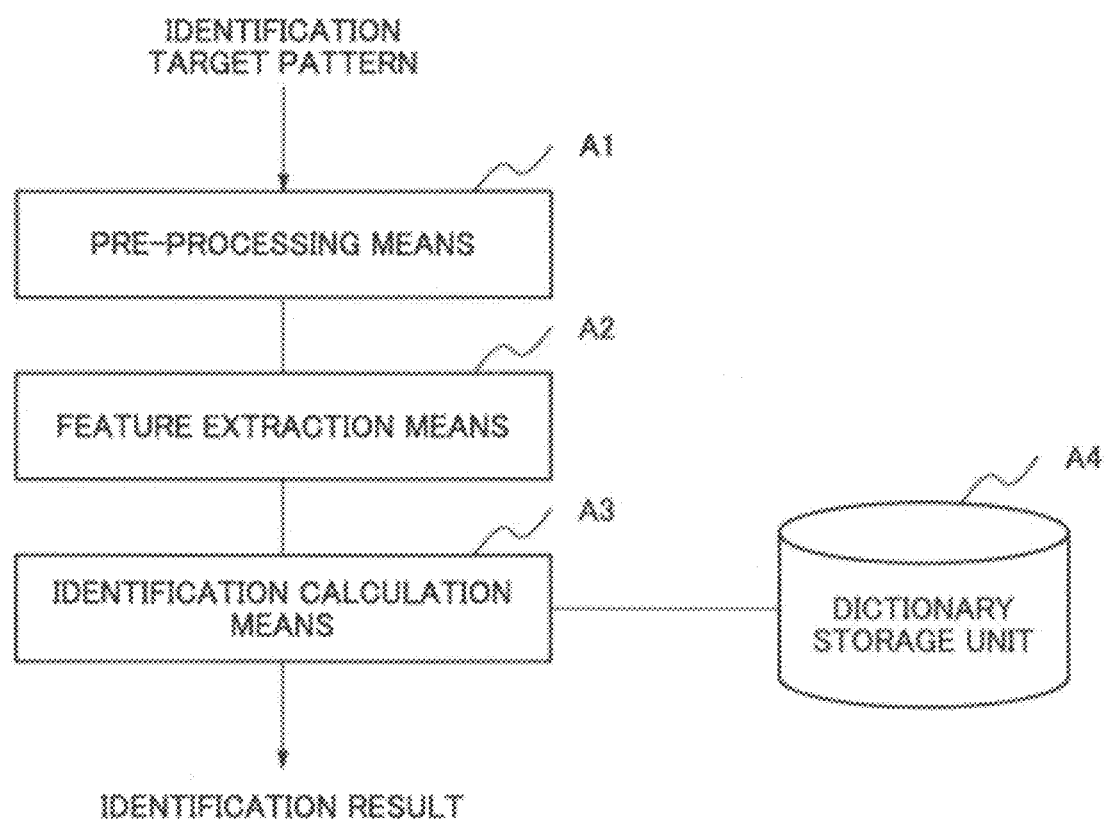
FIG. 14 is a block diagram showing a configuration of an identification device in the related art.

For example, not only the image itself but also for example, data after a predetermined preprocessing (refer to A1 of FIG. 14) is performed or data after image data is compressed by a predetermined reduction process or the like can be used for the learning target pattern and the identification target pattern that are inputted in each exemplary embodiment.

Data after an image processing such as histogram equalization to the target image is performed may be used for the learning target pattern and the identification target pattern. In this case, the learning device, the learning method, the recording medium storing a learning program, the identification device, the identification method, and the recording medium storing an identification program, as well as the learning identification system, the learning identification device, the learning identification method, and the recording medium storing a learning identification program of the present invention can suppress an influence of illumination when the image has been taken. Therefore, an identification performance can be further improved.

The present invention has an effect in which while suppressing the load on calculation cost, the identification accuracy can be improved, and the learning process and the identification process can be smoothly performed. This is one example of the effect of the present invention.

This application claims priority from Japanese Patent Application No. 2010-001265, filed on Jan. 6, 2010, the contents of which are incorporation herein by reference in their entirely.

INDUSTRIAL APPLICABILITY

The present invention can be suitably used for object identification such as character recognition in an image, face recognition, person authentication using a person's face or body, human detection from an image by a monitoring camera, defect detection in a production line of a factory, or the like.

DESCRIPTION OF SYMBOL

10 learning device
11 gradient feature extraction unit
12 sum difference feature extraction unit
13 learning unit
20, 40 storage device
21, 41 dictionary storage unit
22, 42 feature amount temporary storage unit
30 identification device
31 gradient feature extraction unit
32 sum difference feature extraction unit
33 identification unit
90 learning identification system
100 learning identification device

What is claimed is:

1. A learning device comprising:
a gradient feature extraction unit which extracts a gradient feature amount including a gradient direction at each coordinate and a gradient intensity value thereof based on an amount of variation between luminance at each coordinate of an inputted learning target pattern and luminance at a periphery thereof;
a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and a learning unit which acquires a learning parameter at each coordinate based on a predetermined learning algorithm using the gradient feature amount and the sum difference feature amount.

2. The learning device as described in claim 1, wherein the predetermined gradient range is a range in which among four or more gradient directions to which an entire range including all the available gradient directions is quantized, the gradient feature amounts according to two or more quantized gradient directions are included and the other gradient range is a range which is adjacent to the predetermined gradient range and includes the gradient feature amounts according to the quantized gradient directions whose number is equal to the number of quantized gradient directions included in the predetermined gradient range.

3. The learning device as described in claim 2, wherein the sum difference feature amount extraction unit adds the gradient intensity values corresponding to the number of units that is smaller than the number of the quantized gradient directions included in the gradient range among the gradient intensity values according to the gradient directions included in the predetermined gradient range and subtracts the gradient intensity values corresponding to the number of units included in the other gradient range from the calculated sum.

4. The learning device as described in claim 2, farther comprising:

gradient feature number setting means for setting the number of the quantized gradient directions included in the predetermined gradient range and/or the other gradient range according to an input operation.

5. The learning device as described in claim 1, wherein the learning unit acquires the learning parameter based on the gradient feature amount, the sum difference feature amount, and the predetermined learning algorithm using predetermined teacher data corresponding to these feature amounts.

6. The learning device as described in claim 1, wherein the learning device comprises a feature amount temporary storage unit for storing the gradient feature amount including the gradient direction at each coordinate in the learning target pattern and the gradient intensity value thereof; and the sum difference feature extraction unit calculates the sum difference feature amount by adding the gradient intensity values according to the gradient directions included in the predetermined gradient range based on the gradient feature amount taken out from the feature amount temporary storage unit and subtracting the gradient intensity values according to the gradient directions included in the other gradient range adjacent to the predetermined gradient range.

7. The learning device as described in claim 6, wherein the feature amount temporary storage unit stores the gradient feature amounts according to one coordinate in the same or neighboring regions among the respective gradient feature amounts including the gradient direction at each coordinate of the learning target pattern and the gradient intensity value thereof.

8. A learning method comprising the steps of:

extracting a gradient feature amount including a gradient direction at each coordinate and a gradient intensity value thereof based on an amount of variation between luminance at each coordinate of an inputted learning target pattern and luminance at a periphery thereof;

calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and acquiring a learning parameter at each coordinate based on a predetermined learning algorithm using the gradient feature amount and the sum difference feature amount.

9. The learning method as described in claim 8, wherein the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

10. A computer-readable, non-transitory medium storing a learning program causing a computer to function as a gradient feature extraction unit which extracts a gradient feature amount including a gradient direction at each coordinate and a gradient intensity value thereof based on an amount of variation between luminance at each coordinate of an inputted learning target pattern and luminance at a periphery thereof:

a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and a learning unit which acquires a learning parameter at each coordinate based on a predetermined learning algorithm using the gradient feature amount and the sum difference feature amount.

11. A computer-readable, non-transitory medium storing a learning program described in claim 10, wherein the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

12. An identification device comprising:
- a gradient feature extraction unit which extracts a gradient feature amount including a gradient direction at each coordinate and a gradient intensity value thereof based on an amount of variation between luminance at each coordinate of an inputted identification target pattern and luminance at a periphery thereof;
- a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and
- an identification unit which identifies a type to which the identification target pattern belongs among one, two, or more types based on the gradient feature amount, the sum difference feature amount, and a part of or all learning parameters acquired by the predetermined learning algorithm.

13. The identification device as described in claim 12, wherein
the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

14. The identification device as described in claim 13, wherein
the sum difference feature amount extraction unit adds the gradient intensity values corresponding to the number of units that is smaller than the number of the quantized gradient directions included in the gradient range among the gradient intensity values according to the gradient directions included in the predetermined gradient range and subtracts the gradient intensity values corresponding to the number of units included in the other gradient range from the calculated sum.

15. The identification device as described in claim 13, farther comprising
gradient feature number setting means for setting the number of the quantized gradient directions included in the predetermined gradient range and/or the other gradient range according to an input operation.

16. The identification device as described in claim 12, wherein
the identification device comprises a feature amount temporary storage unit for storing the gradient feature amount including the gradient direction at each coordinate of the identification target pattern and the gradient intensity value thereof and
the sum difference feature extraction unit calculates the sum difference feature amount by adding the gradient intensity values according to the gradient directions included in a predetermined gradient range based on the gradient feature amount taken out from the feature amount temporary storage unit and subtracting the gradient intensity values according to the gradient directions included in the other gradient range adjacent to the gradient range from the calculated sum.

17. The identification device as described in claim 16, wherein
the feature amount temporary storage unit stores the gradient feature amounts according to one coordinate in the same or neighboring regions among the respective gradient feature amounts including the gradient direction at each coordinate of the identification target pattern and the gradient intensity value thereof.

18. The identification device as described in claim 12, wherein
the identification device comprises a dictionary storage unit which stores the learning parameter acquired based on the predetermined learning algorithm using the gradient feature amount and the sum difference feature amount with respect to a predetermined learning target parameter; and
the identification unit identifies a type to which the identification target pattern belongs among one or more types based on the gradient feature amount, the sum difference feature amount, and a part of or all learning parameters stored in the dictionary storage unit.

19. The identification device as described in claim 18, wherein
the identification unit identifies a type to which the identification target pattern belongs among one or more types based on the gradient feature amount, the sum difference feature amount, and the learning parameter which is judged to be useful for an identification process among the learning parameters stored in the dictionary storage unit.

20. The identification device as described in claim 12, wherein
the gradient feature extraction unit extracts a specific gradient feature amount which is judged to be useful for the identification process by the identification unit.

21. The identification device as described in any one of claim 12, wherein
the sum difference feature extraction unit calculates a specific sum difference feature amount which is judged to be useful for the identification process by the identification unit.

22. An identification method comprising the steps of:
- extracting a gradient feature amount including a gradient direction at each coordinate and a gradient intensity value thereof based on an amount of variation between luminance at each coordinate of an inputted identification target pattern and luminance at a periphery thereof;
- calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and
- identifying a type to which the identification target pattern belongs among one, two, or more types based on the gradient feature amount, the sum difference feature amount, and a part of or all learning parameters acquired by the predetermined learning algorithm.

23. The identification method as described in claim 22, wherein
the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

24. A computer-readable, non-transitory medium storing an identification program causing a computer to function as
a gradient feature extraction unit which extracts a gradient feature amount including a gradient direction at each coordinate and a gradient intensity value thereof based on an amount of variation between luminance at each coordinate of an inputted identification target pattern and luminance at a periphery thereof;
a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and
an identification unit which identifies a type to which the identification target pattern belongs among one or more types based on the gradient feature amount, the sum difference feature amount, and a part of or all learning parameters acquired by the predetermined learning algorithm.

25. A computer-readable, non-transitory medium storing an identification program as described in claim 24, wherein
the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

26. A learning identification system comprising:
a learning device includes
a gradient feature extraction unit which extracts a gradient feature amount including a gradient direction at each coordinate and a gradient intensity value thereof based on an amount of variation between luminance at each coordinate of an inputted learning target pattern and luminance at a periphery thereof;
a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and
a learning unit which acquires a learning parameter at each coordinate based on a predetermined learning algorithm using the gradient feature amount and the sum difference feature amount; and
an identification device includes
a gradient feature extraction unit which extracts a gradient feature amount including a gradient direction at each coordinate and a gradient intensity value thereof based on an amount of variation between luminance at each coordinate of an inputted identification target pattern and luminance at a periphery thereof,
a sum difference feature extraction unit which calculates a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum, and
an identification unit which identifies a type to which the identification target pattern belongs among one or more types based on the gradient feature amount, the sum difference feature amount, and a part of or all learning parameters acquired by the learning unit.

27. The learning identification system as described in claim 26, wherein
the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

28. A learning identification device including an identification unit for identifying a type to which an identification target pattern belongs among one or more types, wherein
the learning identification device includes
a gradient feature extraction unit which extracts a gradient feature amount including a gradient direction at each coordinate and a gradient intensity value thereof based on an amount of variation between luminance at each coordinate of an inputted learning target pattern and luminance at a periphery thereof,
a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum, and
a learning unit which acquires a learning parameter at each coordinate based on a predetermined learning algorithm using the gradient feature amount and the sum difference feature amount;
the gradient feature extraction unit extracts the gradient feature amount including the gradient direction at each coordinate and the gradient intensity value thereof based on an amount of variation between luminance at each coordinate of the inputted identification target pattern and luminance at a periphery thereof;

the sum difference feature extraction unit calculates a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum; and an identification unit identifies a type to which the identification target pattern belongs among one or more types based on the gradient feature amount and the sum difference feature amount that are calculated from the identification target pattern as well as a part of or all learning parameters acquired by the learning unit.

29. The learning identification device as described in claim 28, wherein the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

30. A learning identification method comprising the steps of:

extracting a gradient feature amount including a gradient direction at each coordinate and a gradient intensity value based on an amount of variation between luminance at each coordinate of an inputted learning target pattern and luminance at a periphery thereof;

calculating a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum;

acquiring a learning parameter at each coordinate based on a predetermined learning algorithm using the gradient feature amount and the sum difference feature amount;

extracting a gradient feature amount including a gradient direction at each coordinate and a gradient intensity value thereof based on an amount of variation between luminance at each coordinate of an inputted identification target pattern and luminance at a periphery thereof, calculating a predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum; and identifying a type to which the identification target pattern belongs among one, two, or more types based on the gradient feature amount and the sum difference feature amount that are calculated from the identification target pattern as well as a part of or all learning parameters acquired by the learning unit.

31. The learning identification method as described in claim 30, wherein the predetermined gradient range is a range in which among four or more gradient directions to which an entire range including all the available gradient directions is quantized, the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

32. A computer-readable, non-transitory medium storing a learning identification program causing:

a computer to function as a gradient feature extraction unit which extracts a gradient feature amount including a gradient direction at each coordinate and a gradient intensity value thereof based on an amount of variation between luminance at each coordinate of an inputted learning target pattern and luminance at a periphery thereof;

a sum difference feature extraction unit which calculates a predetermined sum difference feature amount by adding the gradient intensity values according to the gradient directions included in a predetermined gradient range indicating a range of the predetermined gradient direction based on the extracted gradient feature amount and subtracting the gradient intensity values according to the gradient directions included in the other gradient range adjacent to the predetermined gradient range from the calculated sum; and a learning unit which acquires a learning parameter at each coordinate based on a predetermined learning algorithm using the gradient feature amount and the sum difference feature amount;

the gradient feature extraction unit to obtain the gradient feature amount including the gradient direction at each coordinate and the gradient intensity value thereof based on an amount of variation between luminance at each coordinate of an inputted identification target pattern and luminance at a periphery thereof;

the sum difference feature extraction unit to calculate the predetermined sum difference feature amount by adding the gradient intensity values according to the gradient directions included in a predetermined gradient range based on the extracted gradient feature amount and subtracting the gradient intensity values according to the gradient directions included in the other gradient range adjacent to the gradient range from the calculated sum; and the identification unit to identify a type to which the identification target pattern belongs among one or more types based on the gradient feature amount and the sum difference feature amount that are calculated from the identification target pattern as well as a part of or all learning parameters acquired by the learning unit.

33. A computer-readable, non-transitory medium storing a learning identification program as described in claim 32, wherein the predetermined gradient range is a range in which among four or more gradient directions to which an entire range including all the available gradient directions is quantized;

the gradient feature amounts according to two or more quantized gradient directions are included and the other gradient range is a range which is adjacent to the gradient range and includes the gradient feature amounts according to the quantized gradient directions whose number is equal to the number of quantized gradient directions included in the gradient range.

* * * * *